(12) United States Patent
Boardman, IV

(10) Patent No.: US 6,346,760 B1
(45) Date of Patent: Feb. 12, 2002

(54) AXIAL BOLT-IN CAGE STATOR FRAME ASSEMBLY AND METHOD FOR ASSEMBLING A STATOR

(75) Inventor: William Hunter Boardman, IV, Burnt Hills, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/736,843

(22) Filed: Dec. 14, 2000

(51) Int. Cl.$^7$ ................................................. H02K 1/12
(52) U.S. Cl. ........................ 310/259; 310/258; 310/91
(58) Field of Search .................................. 310/216, 258, 310/259, 260, 89, 91, 51

(56) References Cited

U.S. PATENT DOCUMENTS

| | | | |
|---|---|---|---|
| 2,846,603 A | * 8/1958 | Webster et al. | ............. 310/258 |
| 4,051,399 A | 9/1977 | Stanwick et al. | |
| 4,330,726 A | 5/1982 | Albright et al. | |
| 4,564,779 A | 1/1986 | Terry, Jr. | |
| 4,710,664 A | * 12/1987 | Cox et al. | ...................... 310/91 |
| 4,810,919 A | * 3/1989 | Ponce et al. | ................. 310/217 |
| 4,837,471 A | 6/1989 | Kostoss et al. | |
| 4,916,803 A | 4/1990 | Estrada | |
| 6,104,116 A | 8/2000 | Fuller et al. | |

* cited by examiner

Primary Examiner—Nestor Ramirez
Assistant Examiner—Thanh Lam
(74) Attorney, Agent, or Firm—Nixon & Vanderhye PC

(57) ABSTRACT

A stator cage design is provided in which the core is formed by stacking a plurality of lamination sectors each having grooves or cutouts defined at spaced locations about the outer periphery thereof. The grooves or cutouts of axially adjacent laminations are aligned to define longitudinal grooves for receiving keybars, each of which preferably has a generally circular cross section. A core flange assembly is disposed at least at each longitudinal end of the stacked laminations and includes a plurality of apertures therethrough for receiving the respective keybars. Compression bands are circumferentially disposed about the stacked lamination and keybar assembly to hold the keybars and radially lock the stacked laminations. The core is then concentrically disposed in a stator frame. The stator frame includes frame support plates for being bolted to the flanges of the stator core and radially extending frame section plates disposed at spaced locations along the length thereof between the frame support plates.

20 Claims, 5 Drawing Sheets

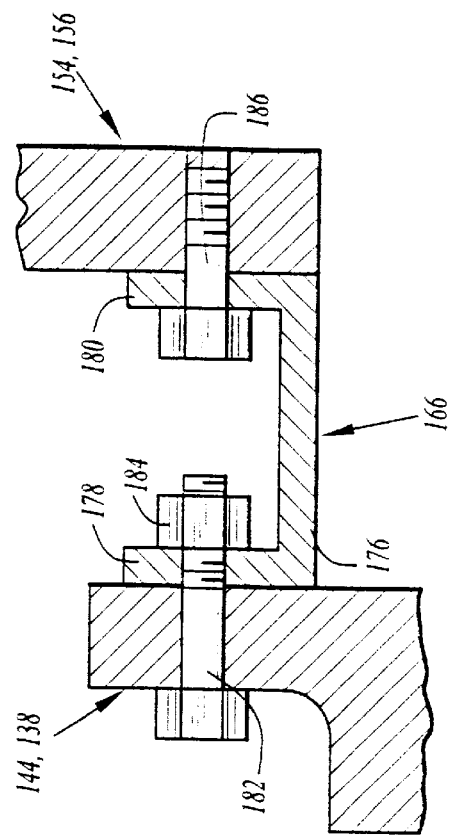
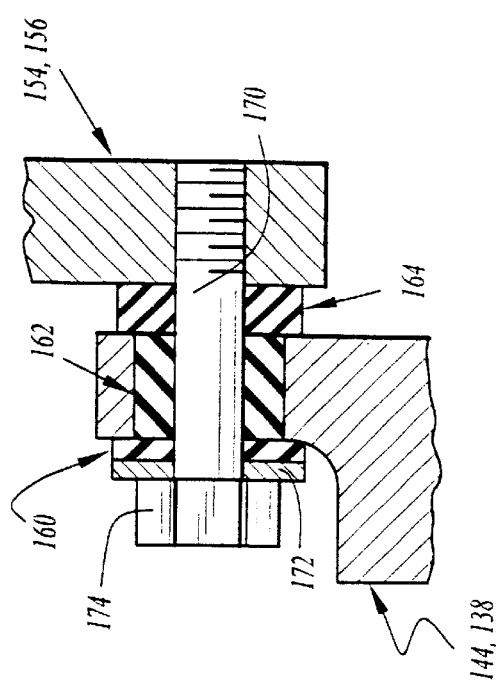

US 6,346,760 B1

AXIAL BOLT-IN CAGE STATOR FRAME ASSEMBLY AND METHOD FOR ASSEMBLING A STATOR

BACKGROUND OF THE INVENTION

The present invention relates in general to dynamoelectric machines and, more particularly, to a stacked generator stator frame assembly adapted to reduce production cycle time, eliminate stacking rework and simplify the core construction. Thus, the present invention discloses an apparatus and method for mechanically coupling stator core lamination sectors to a stator frame.

To better understand the unique and advantageous features of the invention, it is helpful to have an understanding of conventional structures that provide this function. Exemplary such conventional apparatus are disclosed for example in U.S. Pat. Nos. 4,564,779 and 4,837,471, the entire disclosures of each of which are incorporated herein by this reference.

Referring to FIG. 1, a portion of a conventional stator 10 is shown and includes a generally annular stator frame formed by an outer wrapper plate 12 and a plurality of annular web plates 14, only one of which is shown in FIG. 1 for clarity. Holes 16 are bored in the annular web plate 14 sufficiently close to the radially inner edge 18 so that part circular holes result. A plurality of keybars 20 are disposed in respective holes 16. The keybars are used to attach the lamination sectors 22 to the web plates 14. More specifically, the keybars 20 each have a cylindrical portion 24 which is disposed within the holes 16 of the annual web plates 14 and a dovetail portion 26 which extends radially inwardly from the cylindrical portion 24. The dovetail portions 26 of the keybars mate with respective dovetail slots 28 in the radially outer curved edge 30 of stator core lamination sectors 22. The portion of stator 10 shown in FIG. 1 includes several of the plurality of stator slots 32 which contain conventional current carrying conductors 34 (only one occupied slot being shown in FIG. 1 for ease of illustration). The conductors are held in the respective slot by a conventional dovetail retaining wedge (not shown). The stator core is actually built up by stacking large numbers of stator core lamination sectors 22 side by side in sandwiched-like relationship along the dovetails of the keybars. Generally, the sectors are segmental insulated laminations of silicon steel, each typically on the order of 0.3 to 0.5 mm thick. In the illustrated construction of stator 10, the annular web plates 14 are rigidly fixed to outer wrapper plate 12 using weld beads 36.

The above described generator stator frame design requires the frame application and machining be completed prior to cleaning and stacking. Keybars, either welded or bolted in the frame have dovetail locations which require very tight position tolerances to ensure stackablity. The frames are stacked by hand by rocking each core punching/lamination onto the keybar dovetail at axial slot positions located every 14 inches along the axial length of the keybar. The current method of producing stacked stator frames has little margin for fabrication/machining error and often results in rework and extended stacking cycle time.

SUMMARY OF THE INVENTION

The invention is embodied in a stator cage design that allows parallel manufacturing of the stator frame and core, thereby reducing cycle time. The core is formed by stacking a plurality of laminations, each defined by a plurality of lamination sectors that each have one or more grooves or cutouts defined at spaced locations about the outer periphery thereof. The grooves or cutouts of axially adjacent laminations are aligned to define longitudinal grooves for receiving keybars, each of which preferably has a generally circular cross section. Core flanges are disposed at least at each longitudinal end of the stacked laminations and include a plurality of apertures therethrough for receiving the respective keybars. Compression bands are circumferentially disposed about the stacked lamination and keybar assembly to hold the keybars in the circumferential groves of the laminations thereby arch-binding the core, radially locking the stacked laminations. The core is then concentrically assembled into a stator frame. The stator frame includes frame support plates for being bolted to the flanges of the stator core and radially extending frame section plates disposed at spaced locations along the length thereof between the frame support plates. The radially compressed core assures that the core punchings/lamination sectors remain in position with no binding agent required. Since there is no gap between the adjacent lamination sectors, they are self locking under radial compression. Moreover, by providing round keybars with no dovetails, in accordance with a preferred embodiment, and pressing them against complimentarily circular depressions on the core outer surface, the keybars are self located. The radial fit between the keybar and core depression assures no back of core chatter which can occur with traditional keybar dovetails creating noise and excessive core to keybar dovetail clearances.

BRIEF DESCRIPTION OF THE DRAWINGS

These, as well as other objects and advantages of this invention, will be more completely understood and appreciated by careful study of the following more detailed description of the presently preferred exemplary embodiments of the invention taken in conjunction with the accompanying drawings, in which:

FIG. 5 is a cross-section illustrating an isolation system according to an embodiment of the invention; and FIG. 6 is a cross section of an isolation system according to an alternate embodiment of the invention.

DETAILED DESCRIPTION OF THE INVENTION

Figure 1:
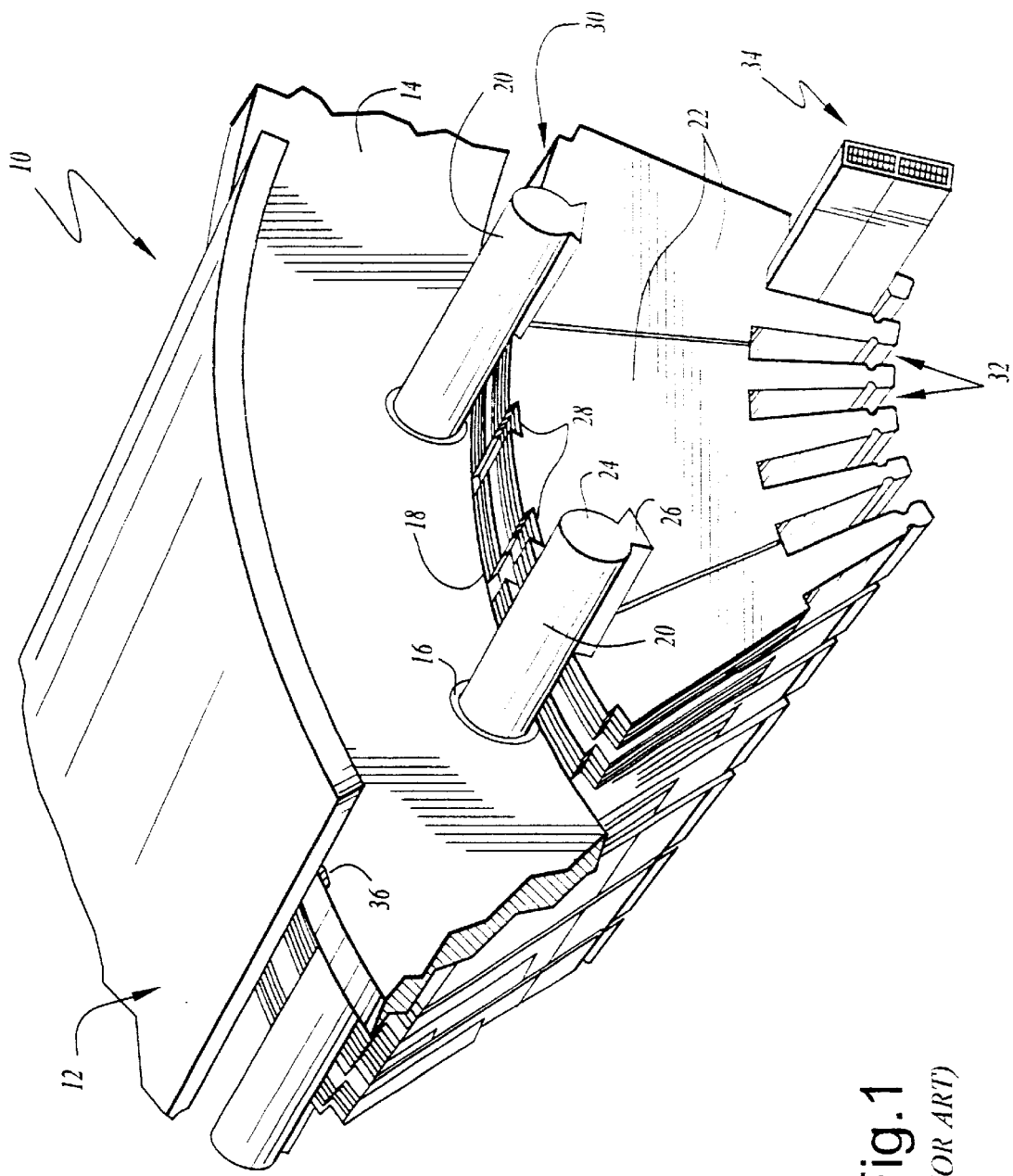
FIG. 1 is a perspective view of a portion of a stator of a dynamoelectric machine showing a conventional keybar construction.
Figure 2:
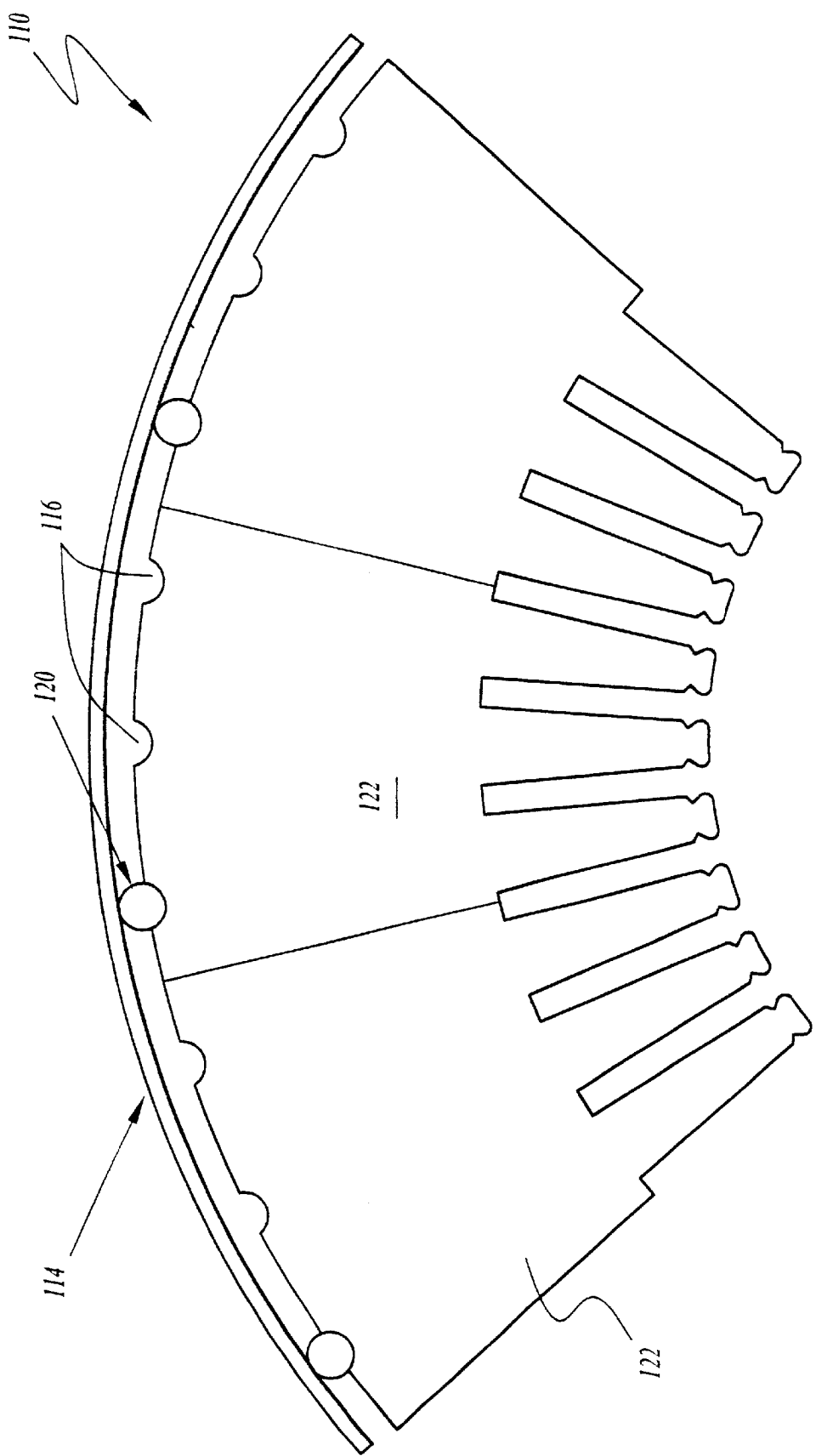
FIG. 2 is an elevational view of a portion of a stator core according to an embodiment of the invention.

Referring now to FIG. 2, a portion of a stator 110 is shown according to an embodiment of the invention. In contrast to the conventional assembly shown in FIG. 1, the outer wrapper plate 12 and annular web plates 14 conventionally provided to support and position the keybars have been omitted and the keybars are self aligned bars 120 which require no welding. In the illustrated, presently preferred embodiment, the bars are generally cylindrical, having a circular cross-section. The dovetail slots 16 conventionally provided on the outer peripheral edge of the lamination sectors that make up each layer of the core have been omitted and instead grooves or cutouts 116 are defined at spaced locations on the outer peripheral edge of the lamination sectors 122 for receiving respective keybars 120. As illustrated in FIG. 2, the shape of the cutouts 116 generally corresponds to the shape of the outer surface of the keybars 120. Thus, to accommodate the cylindrical keybars of the illustrated embodiment, the illustrated grooves or cutouts 116 are of a part circular shape. As described in greater detail below, to hold the keybars and radially lock the lamination sectors 122 that comprise the stacked laminations, compression bands 114, one of which is shown in FIG. 2 and a plurality of which are shown in FIGS. 3 and 4, are tightened around the keybars, similar to belly bands used on large 2-pole generators.

Figure 3:
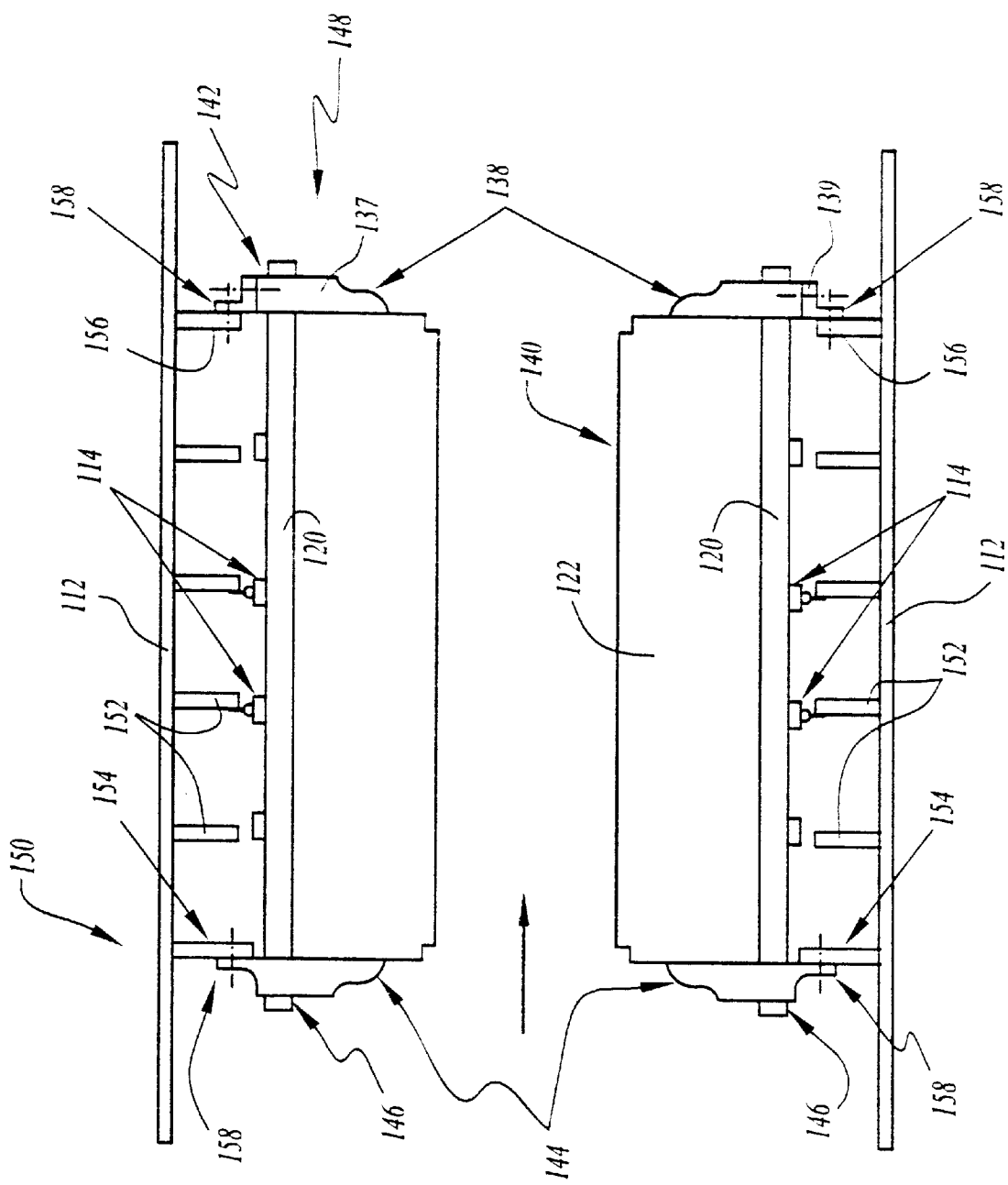
FIG. 3 is a schematic cross-sectional view of an axial bolt-in cage star frame with radially compressed core embodying the invention.
Figure 4:
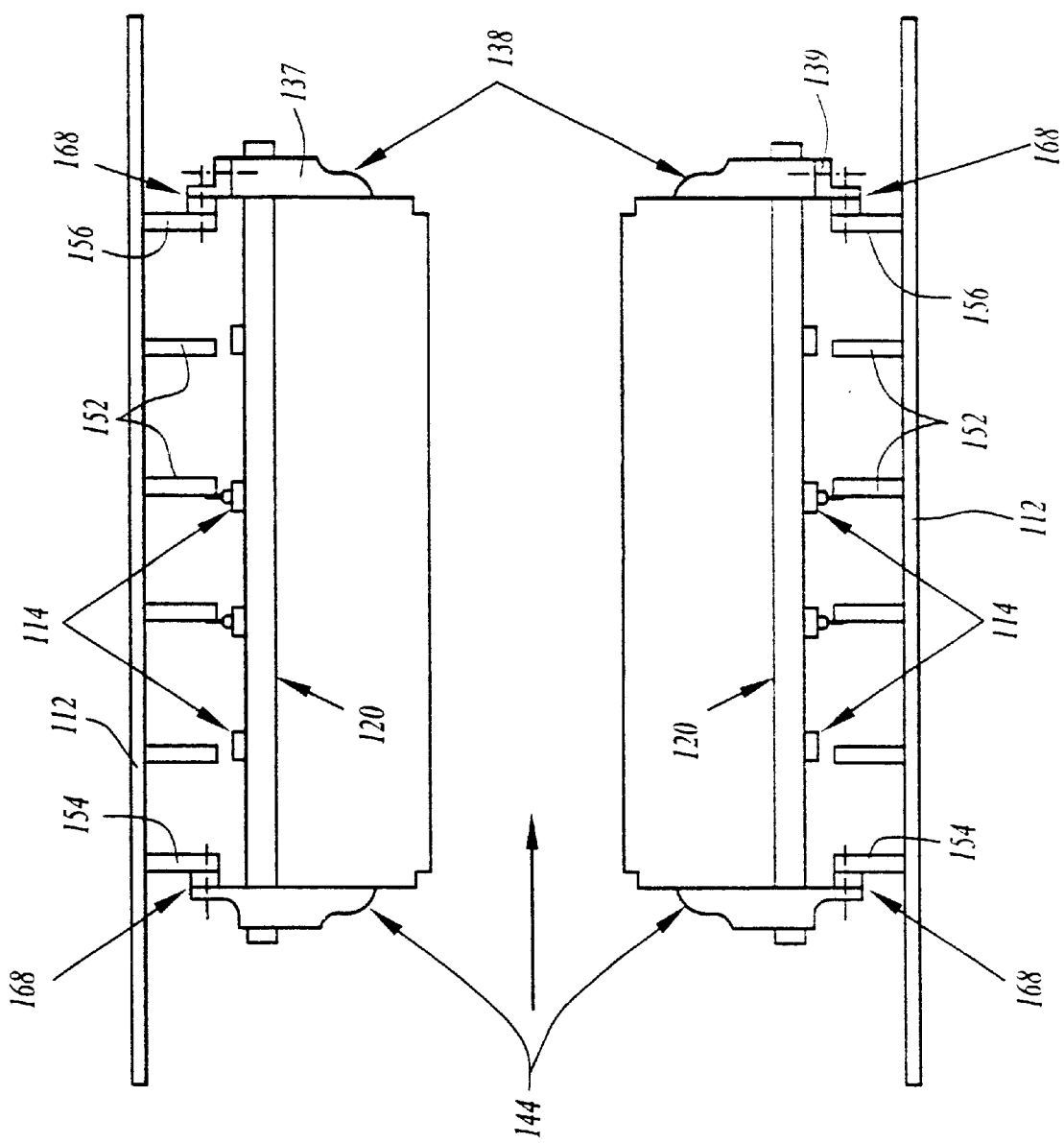
FIG. 4 is a schematic cross-sectional view of an axial bolt-in cage stator frame with radially compressed core and core isolation system embodying the invention.

With reference to FIGS. 2 and 3, one of at least two core flange assemblies 138, 144 is disposed for receiving stacked laminations thereon. For convenience, core flange 138 will be referred to as a bottom core flange assembly although it is to be understood that the stacked laminations could be received on core flange assembly 144. To form the stator, the core defining laminations 122 are stacked with respect to a central mandrel (not shown) to define the core 140. The laminations 122 are stacked or otherwise disposed so that cutouts 116 are aligned with each other and with keybar receiving apertures 142 defined in the bottom core flange. Keybars 120 are inserted in apertures 142 respectively and seated in the longitudinal groove defined by the aligned cutouts 116.

Since in the illustrated embodiment the keybars 120 are round with no dovetail and are placed against circular depressions 116 on the periphery of the core 140, the keybars are self-located with respect to the core. An upper core flange assembly 144 is then lowered to capture the keybars 120 in respective keybar receiving apertures 146 defined therein. The compression bands 114 are applied about the keybars 120 as illustrated in FIGS. 3 and 4. The core is then tightened axially and also radially by tightening the compression bands to press the core. The keybar receiving apertures 142, 146 may be radially elongated so as to accommodate the displacement of the keybars under radial compression by means of the compression bands 114. The radial fit between the keybars 120 and the core depressions 116 along with the radial compression assures no core chatter, which can occur with traditional keybar dovetails, creating noise and excessive core to keybar dovetail clearances in the prior art. The core cage 148 is now complete because, as described below, the core flange assemblies 138, 144 serve the dual function of compressing the core 140 and mounting the core to the stator frame 150. Thus, unlike the traditional cage design, a cage embodying the invention consists essentially of a core 140, flanges 138, 144, keybars 120 and compression bands 114.

As illustrated and described above, the compression bands 114 serve a dual purpose in the assembly of the invention. In the illustrated embodiment, back of core (BOC) baffles 113 are disposed on certain compression bands to isolate different ventilation passages. The bands may be axially aligned with the frame section plates 152 to form ventilation sealing surfaces between inlet and outlet sections of the stator to facilitate BOC sealing.

To assemble the stator, the assembled core 148 is lowered vertically into the stator frame 150 which is comprised of a generally cylindrical outer housing wall 112, frame section plates 152, and frame support plates 154, 156. As shown in FIGS. 3 and 4 and the flange assemblies 138, 144 are bolted to frame support plates 154, 156. In the illustrated embodiment, the bottom flange 138 is an assembly of a bottom flange component 137 that has a diameter smaller than the top support plate 154, so that it may pass through the frame, clearing the section plates. Once inserted, a segmented L-shaped bolting ring or brackets 139 secure the bottom flange component to the frame support plate 156.

The core vibration transmitted to the frame is minimized by supporting at the stator flanges as shown, taking advantage of the radial stiffness of the core flanges 138, 144 as opposed to traditional spring loaded systems which attach to keybars. Additional vibration isolation can be provided at the bolted joints 158 as required. Indeed, as shown in FIGS. 4, 5 and 6, by providing rubber washers 160, grommets 162, and spacers 164 or a cantilevered spring 166 such additional vibration isolation can be provided. More specifically, FIG. 4 schematically illustrates, by way of example, the provision of isolation coupling, generally shown at 168, between the frame support plates 154, 156 and the stator flange assemblies 138, 144. FIGS. 5 and 6 show two non-limiting examples of suitable core isolation structures. In FIG. 5, it can be seen that intermediate the flange assembly 138, 144 and frame support plate 154, 156, a rubber spacer 164 is provided. Moreover, a rubber grommet 162 is provided to surround each of the bolt shafts 170 extending through the bolt holes of the flange assembly 138, 144. Finally, a rubber washer 160 is interposed between e.g. a metallic washer 172 and/or the bolt head 174 and flange assembly 138, 144. Providing a rubber spacer 164, grommet 162 and washer 160 as illustrated in FIG. 5 ensures core isolation. Although not illustrated, a nut may be provided for receiving the bolt 170 on the far, right hand side of the support plate 154, 156.

FIG. 6 illustrates an alternate assembly for providing core isolation with a cantilevered spring. In this illustration, a generally U-shaped cantilevered spring 166 is provided having a spring portion 176 oriented generally parallel to the axis of the core 140 and first and second depending legs 178, 180 oriented at an angle of about 90° with respect to the spring portion 176. Depending leg 178 is bolted via bolt 182 and nut 184 to the core flange assembly 138, 144 and the other depending leg 180 is bolted to the support plate 154, 156, e.g. with a bolt 186. Again, if deemed necessary or desirable, a nut (not shown) may be provided for the free end of the bolt 186.

Although core flange assemblies 138, 144 are shown in the illustrated embodiment only at longitudinal ends of the core 140, intermediate core support plates can be added to accommodate longer machines.

Using the stator frame flange to support the core is a unique feature which makes the simplified design of the invention particularly cost effective.

The vertical bolted joint offers an advantage that each attachment shares the weight of the core equally, as opposed to a radially bolted joint in which load would vary as a sinusoidal distribution with the top and bottom bolts carrying most of the core weight. Another unique design feature of the invention which significantly reduces the cost of the core assembly is the use of core radial compression bands 114 with self positioning core lamination sectors 116 and keybars 120 which do not require dovetails. This aspect of the design greatly simplifies core stacking and lends itself nicely to an automated stacking process. As will be noted from FIG. 2, in particular the clearance between adjacent lamination sectors has been eliminated so that they become self locking and radial compression does not close the stator bar slots and cut into the bar insulation.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A stator assembly comprising:
a stator core including a plurality of coaxially stacked laminations, each said lamination being defined by a plurality of lamination sectors, each said lamination sector having at least one part cutout defined in an outer peripheral edge thereof, said cutouts being axially aligned among said stacked laminations to define a plurality of longitudinally extending grooves generally parallel to a center axis of said stacked laminations;
a keybar received in each said groove, said keybar having an outer peripheral surface complimentary to a shape of a respective said groove so as to be radially received therein;
at least first and second core flange assemblies being disposed respectively at each axial end of said stacked laminations, each said core flange having a plurality of apertures defined therethrough for respectively receiving longitudinal ends of each said keybar; and
a plurality of compression bands provided at spaced locations along the axial length of said stacked laminations, between said first and second core flange assemblies, for holding said keybars in said longitudinal grooves and for radially compressing said lamination sectors comprising said stacked laminations; and
a stator frame including an outer housing wall and a plurality of frame plates projecting radially inwardly therefrom, said frame plates including first and second frame support plates secured respectively to said first and second core flange assemblies to mount said stator core within said stator frame and a plurality of frame section flanges disposed at spaced locations intermediate said frame support plates.

2. A stator assembly as in claim 1, wherein said frame section plates are axially aligned with respective compression bands.

3. A stator assembly as in claim 1, wherein said cutouts defined in said outer peripheral edges of said lamination sectors are part circular and each said keybar has a generally circular cross-section complimentary to said part circular cutouts.

4. A stator assembly as in claim 1, wherein at least one of said core flange assemblies comprises a core flange component for engaging said keybars and the laminate at the respective axial end of said stacked laminations and an L-shaped bolting support radially secured thereto and axially secured to the respective frame support plate.

5. A stator assembly as in claim 1, wherein said core flange assemblies are bolted to said frame support plates.

6. A stator assembly as in claim 5, wherein said core flange assemblies are bolted substantially directly to said frame support plates.

7. A stator assembly as in claim 5, wherein a vibration isolation coupling assembly is interposed between said core flange assemblies and said respective frame support plates.

8. A stator assembly as in claim 7, wherein said vibration isolation coupling assembly comprises an resilient spacer disposed between said core flange assembly and said frame support plate.

9. A stator assembly as in claim 8, wherein said resilient spacer comprises a rubber spacer.

10. A stator assembly as in claim 8, wherein said core flange assemblies are bolted to said frame support plates with a bolt that is disposed through a bolt hole in the core flange assembly and
further comprising a rubber grommet disposed in said bolt hole of the core flange assembly in surrounding relation to the bolt disposed therethrough and a rubber washer for being interposed between a head of said bolt and said core flange assembly.

11. A stator assembly as in claim 8, wherein said resilient spacer comprises a cantilever spring interposed between said core flange assembly and said frame support plate.

12. A stator assembly as in claim 11, wherein said cantilever spring comprises a spring portion and first and second depending legs, said first depending leg being coupled to said core flange assembly and said second depending leg being coupled to said frame support plate.

13. A method of assembling a stator comprising:
providing a plurality of lamination sectors, each said lamination sector having at least one part cutout defined in an outer peripheral edge thereof;
providing a first core flange component;
stacking said plurality of said lamination sectors on said core flange component so as to define a plurality of axially stacked laminations, said lamination sectors being stacked so that said cutouts in said outer peripheral edges thereof are axially aligned to define a plurality of longitudinal grooves parallel to a longitudinal axis of the stacked laminations;
providing a plurality of keybars having outer circumferential shape complimentary to said cutouts;
disposing the keybars in the longitudinal grooves defined by aligned cutouts and said lamination sectors;
inserting one longitudinal end of each said keybar in an aperture defined therefor in said first core flange component;
disposing a second core flange on the other axial end of said stacked laminations so that an opposite longitudinal end of each of said keybar is received in a respective aperture of the second core flange;
disposing a plurality of compression bands circumferentially about said keybars at spaced locations along the length of said stacked laminations;
tightening said compression bands to radially compress the lamination sectors and to hold the keybars thereagainst. thereby to form a stator core;
providing a stator frame assembly;
axially inserting said stator core into said stator frame; and
securing the stator core to the stator frame assembly.

14. A method as in claim 13, wherein said step of providing a stator frame assembly comprises providing an outer housing wall having a plurality of frame plates projecting radially inwardly therefrom, said frame plates including first and second frame support plates and a plurality of frame section flanges disposed at spaced locations intermediate said frame support plates, and wherein said step of securing comprises securing said frame support plates respectively to said first and second core flange assemblies to mount said stator core within said stator frame.

15. A method as in claim 14, wherein said step of securing comprises bolting said core flange components to said frame support plates of said stator frame.

16. A method as in claim 14, wherein said compression bands are disposed so that said frame section plates are axially aligned with respective compression bands.

17. A method as in claim 13, wherein said cutouts defined in said outer peripheral edges of said lamination sectors are part circular and each said keybar has a generally circular cross-section complimentary to said part circular cutouts.

18. A method as in claim 14, wherein before said step of securing said first core flange component to said stator frame, a bolting ring is radially secured to first core flange component and then said bolting ring is axially secured to the respective frame support plate.

19. A method as in claim 14, wherein a vibration isolation coupling is interposed between said core flange assembly and said respective frame support plate.

20. A method as in claim 14, wherein said vibration isolation coupling assembly comprises an resilient spacer disposed between said core flange and said frame support plate.

* * * * *